H. RASBRIDGE.
CHECK VALVE FOR BEER TAPPING APPARATUS.
APPLICATION FILED NOV. 29, 1910.

1,000,121.

Patented Aug. 8, 1911.

Witnesses
C. N. Walker.
L. E. Witham.

Inventor
Harry Rasbridge
By Alexander & Dowell
Attorneys

UNITED STATES PATENT OFFICE.

HARRY RASBRIDGE, OF SLATINGTON, PENNSYLVANIA.

CHECK-VALVE FOR BEER-TAPPING APPARATUS.

1,000,121. Specification of Letters Patent. Patented Aug. 8, 1911.

Application filed November 29, 1910. Serial No. 594,696.

*To all whom it may concern:*

Be it known that I, HARRY RASBRIDGE, of Slatington, in the county of Lehigh and State of Pennsylvania, have invented certain new and useful Improvements in Check-Valves for Beer-Tapping Apparatus; and I hereby declare that the following is a full, clear, and exact description thereof, reference being had to the accompanying drawings, which form part of this specification.

This invention is an improvement in so-called safety-vent or check valves such as are used in apparatus for dispensing beer and the like charged liquids; the valve being designed to be attached to the keg or vessel containing the liquid and to an air pump, or compressed air supply, by which compressed air can be supplied to the vessel as the liquid is withdrawn therefrom.

The object of the invention is to provide a check-valve in which the valve will certainly open under air pressure to admit air into the vessel and close quickly under the pressure of the gas or air in the vessel when the supply of compressed air thereto is stopped,—so as to prevent escape of liquid or gas from the vessel through the valve; one in which the valve cannot be blown out under excessive gas pressure in the vessel; and in which the valve cannot be forced inward by excessive pressure through the air pump; one in which the valve cannot become fouled or choked by the liquid contents of the vessel; will not be injuriously affected by the liquid or gas in the retainer; and in which no rubber is employed; and one in which the valve will be thoroughly and effectively protected against injury by contact with any external body, or by shocks, or in charging the container; and which will be of the simplest possible construction, without springs or other easily worn or weakened parts.

The invention consists in the novel construction of the check-valve as illustrated in the accompanying drawings in which—

Figure 1:
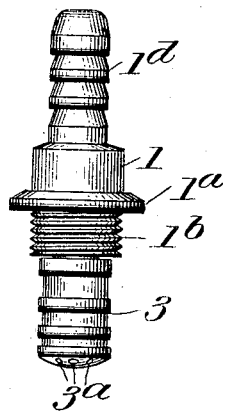
Figure 2:
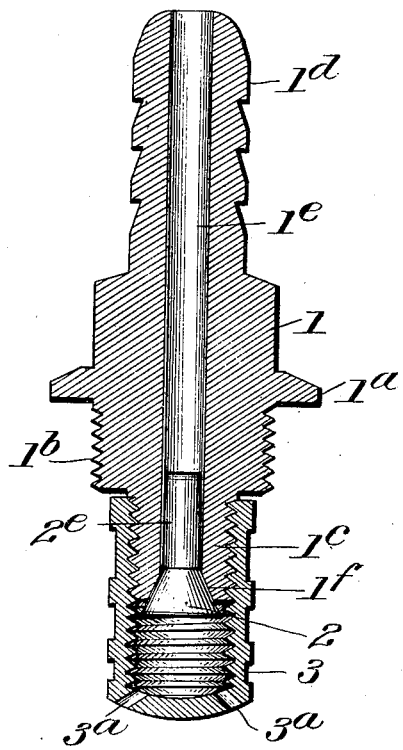
Figure 3:
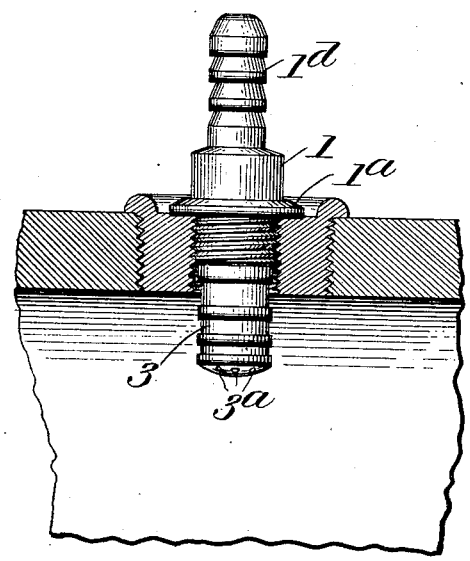
Figure 4:
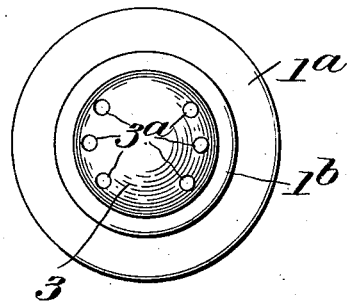

Figure 1 is a side elevation of the valve complete. Fig. 2 is a longitudinal section therethrough enlarged. Fig. 3 is a sectional view of the valve as applied to a beer keg. Fig. 4 is an end view of the valve.

The valve comprises a body 1, preferably formed of brass, provided near its center with an annular flange $1^a$ and having a threaded portion $1^b$ at one side of the collar $1^a$ adapted to be screwed into the bung, or socket piece in the keg or vessel to which the check-valve is to be applied; and beyond this portion $1^b$ the valve has a reduced cylindric externally threaded nipple portion $1^c$. At the opposite side of the flange $1^a$ the body has a reduced cylindrical portion $1^d$ which is preferably annularly grooved for the engagement of a hose (not shown) by which it may be connected to the usual air pump or compressed air reservoir (not shown).

Extending axially through the body is a bore $1^e$ the outer end of which adjacent nipple $1^c$ is counter-sunk to form a conical valve seat $1^f$ against which is adapted to seat a conical valve 2, which valve has a stem $2^e$ slightly smaller in diameter than the bore $1^e$, to permit air to pass around the stem when the valve is opened;—and projecting into the bore $1^e$ sufficiently to guide the valve to and from its seat.

The opening movement of the valve 2 is controlled by a tubular cap-piece 3, which is slightly longer than the nipple $1^c$ and is provided with internal threads adapted to engage the threads of the nipple $1^c$; the cap being screwed onto this nipple after the valve 2 has been inserted in place. When the cap is in position (see Fig. 2) the valve 2 can open or close but its stem cannot disengage the bore $1^e$. This cap 3 is closed at its outer end but is provided with a series of small radiating holes $3^a$ extending through such end, as shown, and by which air passing the valve 2 can enter the vessel.

When compressed air enters passage $1^e$ it unseats valve 2, and passes through the small holes $3^a$ into the vessel; when the air is shut off the pressure of the confined air and gas in the vessel will force the valve 2 to its seat, and it effectively prevents the escape of air or gas in the vessel, and also prevents beer from working back into the air passage $1^e$ and clogging it. The cap 3 protects the valve and limits its opening movement, and no matter how heavy the pressure of air may be it is impossible for it to cause the cap to disengage the nipple.

In my device there are no springs or parts liable to weaken or rust, or corrode; no rubber or other washers are required which would be affected by the acids in the beer, or by the gas; the working part (the valve)

is thoroughly protected, and yet easily accessible, and the exceeding simplicity of the device is one of its chief merits.

What I claim is:

In a valve for the purpose specified, the combination of a cylindric body having a thick central portion provided with an exterior annular flange, an end portion at the outer side of the central portion reduced in diameter and adapted for connection with a hose, the central portion at the side of the flange opposite the hose-engaging portion being threaded for engagement with an opening in the vessel containing liquid; said body having a further reduced portion at the inner end of the central portion externally threaded to form a nipple; said body also having a straight central bore extending axially through all said portions and having a valve seat at its inner end; with a metal valve adapted to engage said seat and close the bore and having a stem entering the bore; and a tubular internally threaded metal cap screwed onto the nipple to retain and protect the valve and limit the opening movement thereof, said cap-piece having apertures in its end wall opposite the valve, substantially as described.

In testimony that I claim the foregoing as my own, I affix my signature in presence of two witnesses.

HARRY RASBRIDGE.

Witnesses:
G. F. OPLINGER,
CHARLES D. PETERS.

---

Copies of this patent may be obtained for five cents each, by addressing the "Commissioner of Patents Washington, D. C."